United States Patent

[11] 3,582,638

| [72] | Inventor | Maurice E. Peters<br>Xenia, Ohio |
|------|----------|----------------------------------|
| [21] | Appl. No. | 722,894 |
| [22] | Filed | Apr. 22, 1968 |
| [45] | Patented | June 1, 1971 |
| [73] | Assignee | Kurz-Kasch, Inc.<br>Dayton, Ohio |

[54] SPOT LIGHTING DEVICE
10 Claims, 6 Drawing Figs.

[52] U.S. Cl.................................................. 240/6.46,
240/1, 240/2.18, 240/10.66, 240/52.15
[51] Int. Cl........................................................ F21v 33/00
[50] Field of Search............................................ 240/6.46,
10.66, 10.5, 10.6, 2.18, I.E.I., 52.15; 350/96

[56] References Cited
UNITED STATES PATENTS

| 1,932,143 | 10/1933 | Piercy | 240/52.15 |
| 2,273,360 | 2/1942 | Kidder | 240/6.46(X) |
| 2,358,867 | 9/1944 | Madan | 240/1(X) |
| 2,424,064 | 7/1947 | Stegeman | 240/2.18 |
| 2,922,873 | 1/1960 | Bibbero et al. | 240/6.46(X) |
| 3,131,690 | 5/1964 | Innis et al. | 240/1(X) |
| 3,327,712 | 6/1967 | Kaufman et al. | 350/96 |

OTHER REFERENCES
" Lucite Light Pointer" by Jack Najork CQ pg 22, May 1948

*Primary Examiner*—Samuel S. Matthews
*Assistant Examiner*—Richard L. Moses
*Attorney*—Jerome P. Bloom

ABSTRACT: A light projecting device featuring a unique adapter enabling the ready mount of a flexible light guide to a pocket flashlight or other light source whereby to provide a simple but highly effective means for directing emitted light to a remote difficult to illuminate spot. The adapter includes a tubular light channelling device held relatively to an illuminable lamp and providing a bearing for the flexible light guide.

PATENTED JUN 1 1971  3,582,638
FIG-1
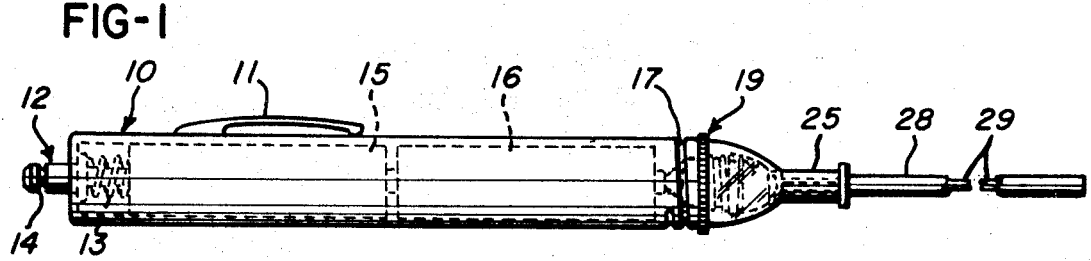
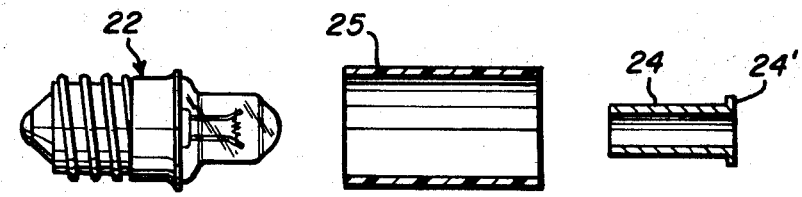
FIG-2
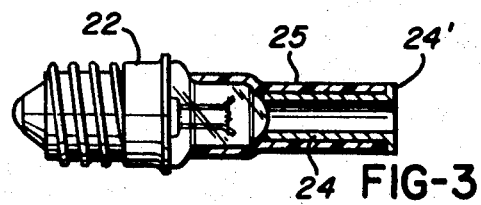
FIG-3
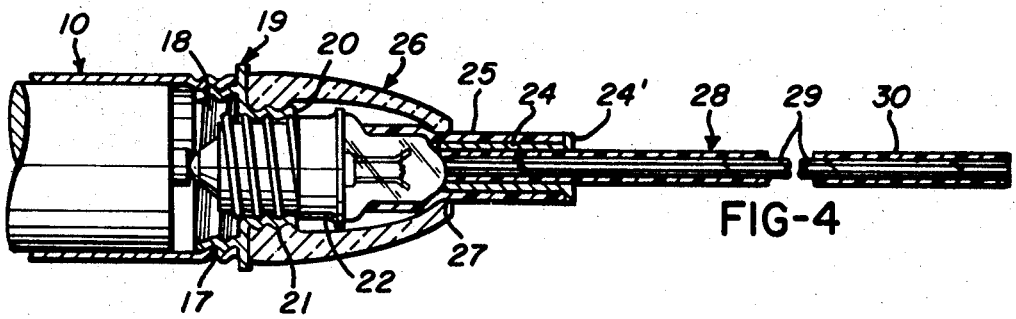
FIG-4
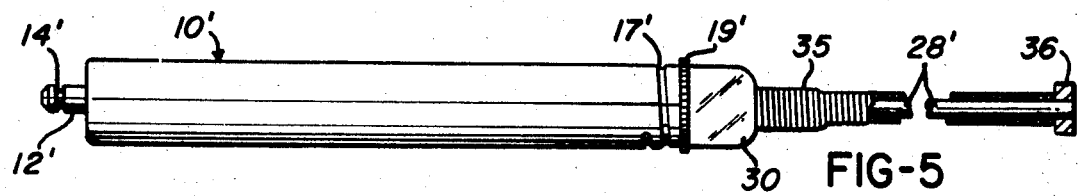
FIG-5
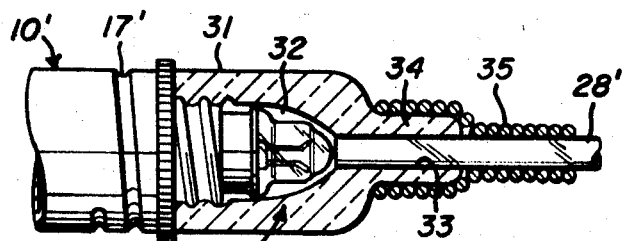
FIG-6
INVENTOR
MAURICE E. PETERS
BY  Jerome P. Bloom
ATTORNEY

SPOT LIGHTING DEVICE

This invention relates to light projecting devices and means which uniquely adapt such devices to mount flexible light guides whereby the light from a conventional source may be easily directed for spot illumination of a normally inaccessible remote location. Although not so limited, the invention has a particularly advantageous application to pocket type flashlights and will be so described.

Light sources such as pocket flashlights are in general use as a means of quick, convenient and spot illumination. However, a limitation in their use arises from their inability to cast a concentrated beam for any substantial distance. Also, many locations having restricted access and are not readily lighted by conventional means. If such locations are capable of being lighted, the light source interferes with visual observation. Conventional light projecting devices are further limited in that they have no ready facility for directing light in a devious path. Such problems as these are the target of this invention.

It is therefore a primary object of the invention to provide an energizable source with special adapter means facilitating the spot projection of light to small areas normally difficult to light with any efficiency.

A further object of the invention is to provide a spot lighting device which is economical to fabricate, more efficient and satisfactory in use, adaptable to a wide variety of applications and unlikely to malfunction.

Another object of the invention is to expand the capability of pocket type flashlights and similar light sources to the end that they may be simply adapted to cast a direction controlled light beam.

Another object of the invention is to provide a unique means to adapt a pocket flashlight or lighting device to mount light guide means capable of conducting emitted light in either a straight or a deviating line and to relatively inaccessible locations which are normally difficult to light.

A still further object of the invention is to enhance the advantages inherent in a pen-type flashlight or similar light source by means of a unique adapter mounting thereto a light guide means in the form of a slender cablelike device capable of entering relatively involved areas, moving around corners and casting a spot of light on a location which is normally difficult to light.

An additional object of the invention is to provide a generally new means of adapting a fiber optic concept to a flashlight or similar light projecting device.

Another object of the invention is to utilize heat shrinkable plastic tubing to achieve an adapter assembly by means of which emitted light may be directed from a lamp source to flexible light guide means, simply attached to project therefrom in a stabilized manner.

A further object of the invention is to provide a lighting device possessing the advantageous structural features, the inherent meritorious characteristics and the means and mode of use herein described.

With the above and other incidental objects in view as will more fully appear in the specification, the invention intended to be protected by Letters Patent consists of the features of construction, the parts and combinations thereof, and the means and mode of operation as hereinafter described or illustrated in the accompanying drawings, or their equivalents.

Referring to the drawings wherein some but not necessarily the only forms of embodiment of the invention are shown, FIG. 1 is a side view of a pen-type flashlight equipped with a light projecting adapter in accordance with one embodiment of the invention;

FIG. 2 is an exploded view showing elements of the particular adapter means utilized in the embodiment of FIG. 1, the parts being shown as they appear prior to assembly and before shrinking of the connector element;

FIG. 3 is a view of the parts of FIG. 2 after assembly by shrinking;

FIG. 4 is a fragmentary cross-sectional view of the device of FIG. 1;

FIG. 5 is a view similar to FIG. 1 showing a second embodiment of the invention; and FIG. 6 is a fragmentary cross-sectional view of the device shown in FIG. 5

Like parts are indicated by similar characters of reference throughout the several views.

In the drawings the invention is disclosed as embodied in a pocket or pen-type flashlight. It will be evident from the further disclosure, however, that the invention has broader aspects, particularly as it is concerned with adapter means which have a general application to light projecting devices.

As shown in FIG. 1, a pen-type flashlight comprises a relatively small diameter metal housing 10 of tubular form, closed to one end and mounting a spring clip 11. Such a device may be conveniently carried in a pocket or other receptacle and yieldingly held in place by the spring clip. The closure to the one end of the housing 10 has a small central aperture which accommodates the projection therethrough of a plunger 12. Interiorly of the housing the plunger 12 includes an external flangelike projection which abuts the enclosure so as to limit the external projection of one end thereof. A spring 13 is suitably fixed to and interiorly of the housing to have one end maintain the plunger in a normally projected relation, as shown in FIG. 1. The other end of the spring 13 provides a seat for a pair of tandem arranged, end abutting, batteries 15 and 16. The latter are free and substantially fill the housing 10.

The open end of the housing 10, as illustrated, is formed with a single internal screw thread 17. The latter is threadedly engaged by an inner segment 18 of a tubular adapter 19. The tubular segment 1 is externally threaded and of a dimension to screw to and mate with the thread 17. The adapter 19 further includes an outwardly projected tubular segment 20. The segment 20 is formed with both internal and external threads 21 of a diameter smaller than that of the thread 17. The thread 21 interiorly of the segment 20 is so formed to accommodate the threaded engagement therein of the base of a conventional flashlight bulb 22. It is to be noted that the adapter segments 18 and 20 are in immediately following relation and the plane of demarcation therebetween is defined by an integrally formed externally projected flange the external surface of which is knurled. This last facilitates the selective rotary adjustment of the adapter 19 in reference to the thread 17, in a sense either inwardly or outwardly of the open end of the housing 10.

Referring once more to the plunger 12, it may be readily seen in FIG. 1 that the outermost end thereof has an annular groove 14. With the bulb 22 appropriately engaged in the socket provided by the outer segment 20 of adapter 19, the plunger 12 may be pressed inwardly of the housing 10 and moved so the edge of the aperture accommodating the plunger is engaged in the groove 14. This latches the plunger to maintain a contact of the batteries involved in a fixed end contacting relation and to complete a circuit to light the bulb in a conventional manner. Release of the plunger breaks the circuit, again conventionally, the plunger 12 projecting automatically under the influence of the spring 13.

The embodiment of the invention shown in FIGS. 1—4 includes a unique adapter means of which the bulb 22 is a base part. The adapter means is comprised originally of the bulb, a relatively rigid tubular metal eyelet 24 and a resilient deformable connector sleeve 25. The latter is a heat shrinkable tubing, preferrably made of polyolefin or material of like characteristics. Referring to FIG. 2 of the drawings, it may be there seen that prior to the assembly of the adapter means the internal diameter of the tubular sleeve 25 is originally considerably greater than the outer dimension of the bulb 22 and the eyelet 24. Note that the outer end of the eyelet 24 has formed thereon an external flange 24'.

In assembling the adapter means, sleeve 25 is placed in telescoping relation to the eyelet 24 with one end thereof so positioned that on shrinking it will abut the flange 24'. The opposite end of the sleeve, which is in relatively projecting relation to the eyelet 24, is so positioned to receive therein a substantial part of the light emitting portion of the bulb 22. When the parts are placed in an assembled relation as described, the sleeve 25 thus telescopes on both the eyelet 24 and the bulb 22. Moreover, eyelet 24 has its inner end abutted with and open to the bulb. At this point heat is applied to the sleeve and in substantially instantaneous response the sleeve shrinks to a close fitting contact with the eyelet and enclosed bulb portion. One end of the sleeve is thus caused to conform and sealingly adhere to the configuration of the bulb while the remainder extends the length of the eyelet to the flange 24' and sealingly conforms and adheres to the eyelet.

As shown in FIG. 3, the result is to produce a substantially unitary assembly of a bulb, sleeve and eyelet with the bulb and eyelet in end abutting coaxial relation, the one end of the sleeve acting as a shroud with respect to the bulb, restricting lateral light emission. It will be observed that the portion of the sleeve which shrinks about the eyelet fixes and stabilizes the eyelet in its projected relation to the bulb. The eyelet thus provides an end sealed channeling device for light issuing from the bulb.

As will be obvious, the whole adapter means above described may be screwed into the outermost end of the tubular adapter 19 as a unit. On mounting this adapter means to the power generating unit as provided by the housing 10, a conventional flashlight cap 26 of conical shell form, having a central aperture 27 at its apex, is threadedly engaged about the outer tubular segment 20 of the adapter 19. As the cap is applied, the aperture at its apex is so dimensioned to enable it to accommodate the projection therethrough of the eyelet mounted portion of sleeve 25, the flange 24' being appropriately dimensioned for this purpose. This assembly may be particularly observed with reference to FIG. 4 of the drawings.

As the base of the cap 26 is turned on to external threads 21 and drawn down to seat to the external flange of the tubular adapter 19, the outer end of the cap surrounding opening 27 is brought to seat against the relatively flaring projecting part of sleeve 25 as determined by the form of the bulb to which it sealingly adheres. This provides a pressured containment of the sleeve 25 at this point against the bulb.

As will be seen, the adapter means including the elements 24 and 25 as applied to the bulb 22 is thus established to form a light channeling device of tubular form. In accordance with one form of embodiment of the instant invention as shown in FIGS. 1—4, the light channeled into the eyelet 24 is further concentrated and controlled for spot application at relatively remote locations. This is achieved by insertion in the eyelet, to have one end abut the exposed portion of the bulb 22, of a light guide 28. The latter is in the form of an elongate means and of a diameter to frictionally seat within the eyelet. It comprises a plurality or bundle of attenuated light transmitting fiber elements of glass or plastic having the capability not only of transmitting light in an axial sense but the further capability of affording a directed light path on bending and flexing, all this without interfering with its light carrying capacity. The bundle of fiber elements here identified as 29 is encased in a plastic light containing sheath 30. The guide member 28 so formed has a flexible and cablelike form adapting it to be threaded around obstructions and to apply its light emitting extremity in immediately adjacent relation to a remote area which is normally difficult to light by conventional means. Of course the sheath 30 is open to both its ends so light may be channeled directly from the bulb to and through the fibers and thereby achieve the application of a concentrated spot of light where ever the end of the guide 28 is directed.

It will be observed that both the nature of the adapter means applied to the bulb 22 and the relationship of the flexible guide 28 to the eyelet 24 obviates lateral dissipation of light. The efficiency of the device is readily obvious when one contemplates the advantage of a light channeling member which may be curved in part as well as coaxial with the axis of the bulb 22 without diminishing the power or capacity of the transmitted light which emits from the bulb.

Further, the importance of the inventive adapter means above described becomes even more evident from the fact that as light guide member 28 has one end thrust into the eyelet 24 and advanced into or substantially into contact with the bulb, the guide member 28 is provided with a bearing support in the eyelet and due to its frictional engagement therewith is stabilized at its root. This insures that not only will the light rays emitted from the lamp bulb directly transmit but that there is a positive means at the root of the flexible guide to control its movements and positioning as it is inserted in a devious path.

While the material of the sleeve 25 has been indicated as polyolefin, other materials of appropriate characteristic may be used, such as Polyvinyl Chloride, Irridated Kynar, and Teflon.

The second illustrated embodiment of the invention is somewhat similar in environment to the first. To facilitate the understanding of this embodiment, parts comparable to those used in the first embodiment are identified by like numerals. As shown, this embodiment also contemplates the use of a pen-type flashlight wherein a housing 10' of tubular form mounts a spring clip 11'. The housing 10' again incorporates a plunger 12' biased to project outwardly of the housing under the influence of a spring 13', the parts being constructed and functioning as previously described. The housing 10' accommodates batteries 15' and 16' in end abutting relation to each other and the spring 13'. The open end of the housing remote from the plunger has an internal thread 17' which is threadedly engaged by the large diameter segment 18' of the tubular adapter 19'. The small diameter segment 20' of the adapter 19' threadedly receives the base of a bulb 22'. To this point, the illustrated embodiments are identical in character. One further similarity is that this second embodiment also employs a flexible light guide 18' identical in form and construction with the previously described guide 28. However, beyond this the structure differs.

There is a cap 30 in this case which is completely different from the conventional cap 26 employed in the first described embodiment. The cap 30 has an externally stepped cylindrical form. It includes an innermost portion 31 which has a cavity 32 the conformation of which is designed to accommodate the nesting therein of the bulb 22'. An internal thread in the cavity wall enables a threaded engagement of the cap about the outer segment 20' of the tubular adapter 19' to sealingly abut the adapter flange. The cap 30 also has an axial aperture 33 arranged to extend coaxial with the bulb 22' and to open from the cavity 32 to and through the outwardly projected reduced diameter cap portion 34. Thus, the cap provides an axially projected portion 34 which affords a light directing channel. This channel frictionally receives one end of the flexible light guide 28' which fills the channel and is stabilized by the channel wall as provided by the tubular cap extension 34.

The operation and use of the device here described is the same as in the first embodiment. Light emitted from the bulb 22' is constrained to flow directly into and axially of the light guide member 28' and is conducted and directed thereby to a desired place of application. As in the first case, the light may be directed through bends and curves to apply to the precise area desired which may otherwise be incapable of visual observation using conventional light means. In this second illustrated instance, however, stabilizing means is optionally provided where desirable to maintain the light guide means 28' normally in a longitudinally projecting more stabilized relation to the power generating unit afforded by the pen light. This is achieved without diminishing the capability of flexure of the light guide means to a desired condition of curvature. As represented in the drawings, this stabilizing means is provided by a coil spring 35 one end of which is expanded about the reduced diameter portion 34 of the cap 30 to achieve a frictional grip of such cap. Beyond this cap based end, the spring member extends in relatively close fitting relation about and lengthwise of the light guide 28', substantially to its outer end. Secured to the outer end of the spring means 35, as by welding, is an annular permanent magnet 36 the central opening of which exposes the light delivery extremity of the ends of the light transmitting fibers contained in the light guide. Adapted for selective use, as may be required or desirable, the magnet 36 provides a means of selectively anchoring the outer end of the light guide means at a selected location. This spots the light emitting from the light guide in a relatively fixed orientation while the power generating unit may be adjusted to a convenient attitude. A changing alignment between the power generating unit and the magnet is accommodated by the flexing of the light guide means and its surrounding spring.

In summary, in use of the devices as described, a very economical adapter means may be provided to add considerable flexibility and capability to a light source such as a pen light. By containing thereto and stabilizing a flexible light guide such as 28 or 28' it provides an extremely versatile assembly for producing a spot of concentrated light in an area where means affording a direct application of light might per se block visual observation. The devices described thus include a unique simple expedient for converting any conventional light source into a remarkably versatile unit. Not only is the means provided for achieving the desired results highly economical but it is so small that it can be readily carried in the pocket if so desired.

As heretofore noted, the invention is not limited to embodiment in a pen-type or pocket type flashlight but has general application to light projecting devices. It will be readily apparent that the adapter concept has general utility also in the field of fiber optics. The simple assembly, for example, in which a metallic eyelet or like means provides a bearing support for one end of light guide means while a surrounding heat shrinkable plastic tubing joins the eyelet to a bulb means is broadly useful for light emitting and controlling systems.

From the above-description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect, and the invention is therefore claimed in any of its forms or modifications within the legitimate and valid scope of the appended claims.

Having thus described my invention, I claim:

1. A light projecting device including a housing having illuminable light means, a cap for said light means in direct connection with said light means defining a channel for light projecting extending through said cap, an elongate light guide means having one end thereof received in said channel and the other end extending a substantial distance therefrom, said channel defining means providing means for retention of said guide means to have one end thereof aligned with said light means, said guide means being adaptable anywhere along its length to orient selectively in the axis of said light means or to deviate therefrom without affecting its light transmitting capacity, said channel defining means including a relatively inflexible tube segment having means forming an extension of one end thereof adapted to the configuration of said light means and sealingly adhered thereto to provide that light emitted from said light means is channelled directly through said tube segment, said extension of said tube segment being formed of a tubular plastic which is heat shrunk to said light means to fix said tube segment in end contacting communication with said light means and in a stabilized projected relation thereto.

2. A light projecting device including a housing having illuminable light means and means in connection therewith defining a channel for light projection, an elongate light guide means having one end thereof received in said channel and the other end extending a substantial distance therefrom, said channel defining means providing means for retention of said guide means to have one end thereof aligned with said light means and said guide means being adaptable anywhere along its length to orient selectively in the axis of said light means or to deviate therefrom without affecting its light transmitting capacity, said illuminable light means having the form of a lamp bulb, a cap for said bulb having an aperture and there being means in connection therewith defining said aperture and forming said channel, said channel being relatively extended and said one end of said guide means having a bearing support therein and a frictional engagement with said channel defining means, there further being a spring based on said cap at one end and extending forwardly therefrom in surrounding supporting relation to said guide means, said spring being substantially coextensive with said guide means and terminating at its outer end in an annular permanent magnet.

3. A light projecting device including a housing having illuminable light means and means in connection therewith defining a channel for light projection, an elongate light guide means having one end thereof received in said channel and the other end extending a substantial distance therefrom, said channel defining means providing means for retention of said guide means to have one end thereof aligned with said light means, said guide means being adaptable anywhere along its length to orient selectively in the axis of said light means or to deviate therefrom without affecting its light transmitting capacity, a cap for said light means having an opening in alignment therewith, said channel defining means including a relatively inflexible tube segment having one end projecting in said opening and means sealing its said one end to the surface of said light means to provide that light emitted from said light means is channelled directly therethrough, said light means being a bulb, said tube segment receiving said guide means in a close fit, and said sealing means being a relatively flexible sleeve surrounding said tube segment and having a projected portion which resiliently receives therein and conforms to the outer end of said bulb, said sleeve being opaque to inhibit lateral light emissions and holding said tubular member in end abutting relation to said lamp and in a stabilized projected relation thereto.

4. Adapter means for applying a light transmitting medium to a power source including an illuminable lamp and a cap for said lamp comprising in association with said cap and projecting therefrom a tubular member and a relatively resilient sleeve in surrounding close fitting relation to said member having one end thereof projecting beyond said member to contact and encase a portion of said lamp in surrounding close fitting relation thereto and to define thereby a direct path for light emitted from said lamp to move directly to and through said tubular member, said sleeve being opaque to inhibit lateral light emission and holding said tubular member in end abutting relation to said lamp and in a stabilized projected relation thereto.

5. A device as in claim 4 characterized by said sleeve being shrunk fit to said lamp and said tubular member to establish said tubular member in end contacting relatively rigid projecting relation to said lamp.

6. Apparatus according to claim 4 characterized by said lamp being applied to a pen-type flashlight said cap being an apertured cap for said lamp in connection with said flashlight, the aperture in said cap accommodating the projection therethrough of said tubular member, there further being a solid flexible light guide means of longitudinally extended form, one end of which is inserted in and stabilized by said tubular member, the remainder of which may be flexed and bent past obstructions to produce a spot of light in an area normally difficult to light by conventional means, in a manner to maintain visibility of said area.

7. A light projecting device including a unit adapted to be held in the hand and terminating at one portion in an illuminable lamp having a cap tubular means fixed in axially projecting relation to said lamp and relative to said unit and said cap, said tubular means having a portion defining an inner bore so disposing relative to said lamp as to form a direct effective continuation thereof for an axial transmission of light, and a slender flexible light transmitting means having one end received in said inner bore portion of said tubular means to substantially contact with said lamp, said light transmitting means having a frictional bearing in said bore and extending through and beyond the outer end thereof for a selectively directed transmission of emitted light and said tubular means having in connection therewith resilient means for a stabilized mount of said light transmitting means in substantially end contacting relation to said lamp, said light transmitting means being adaptable anywhere along its length to orient selectively in the axis of said light means or to deviate therefrom without affecting its light transmitting capacity.

8. A light projecting device according to claim 7, wherein said tubular means is part of an adapter means comprising an elongated eyelet defining said bore and adapted to seat at one end of said lamp and project therefrom, and further comprising a resilient sleeve in a surrounding close fitting relation to said eyelet and extending beyond the said one end thereof to achieve a similar surrounding close fitting relation to said lamp, holding said lamp and eyelet in a unitary relation and providing said stabilized mount.

9. A light projecting device according to claim 8, wherein said sleeve expands at the joint between said eyelet and said lamp to accommodate a larger diameter of the lamp, characterized by a cap mounted on said power generating unit in a surrounding relation to said lamp and having an axial end opening through which said eyelet projects, said cap at the periphery of said axial end opening having a bearing on said sleeve substantially at the said joint between said eyelet and said lamp.

10. A light projecting device including a portable power generating unit adapted to be held in the hand and terminating at one portion in an illuminable lamp, tubular means fixed in axially projecting relation to said lamp and relative to said unit, said tubular means having a portion defining an inner bore so disposing relative to said lamp as to form a direct effective continuation thereof for an axial transmission of light, and a slender flexible light transmitting means having one end received in said inner bore portion of said tubular means to substantially contact said lamp, said light transmitting means having a frictional bearing in said bore and extending through and beyond the outer end thereof for a selectively directed transmission of emitted light, said tubular means being a part of a cap mounted on said unit in a surrounding relation to said lamp and terminating in a reduced diameter portion beyond the lamp forming said bore, and a coil spring wound on the reduced diameter portion of said cap and extending therefrom in continuously wound relation to said slender flexible light transmitting means substantially throughout the length thereof.

UNITED STATES PATENT OFFICE
CERTIFICATE OF CORRECTION

Patent No. 3,582,638          Dated June 1, 1971

Inventor(s)    Maurice E. Peters

It is certified that error appears in the above-identified patent and that said Letters Patent are hereby corrected as shown below:

Column 2, line 28, "1" should read -- 18 --.

Column 4, line 31, "18'" should read -- 28' --.

Column 5, line 48 (Claim 1, line 2), preceding "in direct", insert -- , means --.

Column 5, lines 49-50 (Claim 1, lines 3-4), "projecting" is amended to read -- projection --.

Column 6, line 42 (Claim 4, line 3), following "comprising", insert a comma.

Column 6, line 43 (Claim 4, line 4), following "therefrom", insert a comma.

Signed and sealed this 18th day of January 1972.

(SEAL)
Attest:

EDWARD M. FLETCHER, JR.      ROBERT GOTTSCHALK
Attesting Officer             Acting Commissioner of Patents